(No Model.)
W. H. ROBINSON.
SUSPENSION HARNESS RACK.
No. 366,030. Patented July 5, 1887.
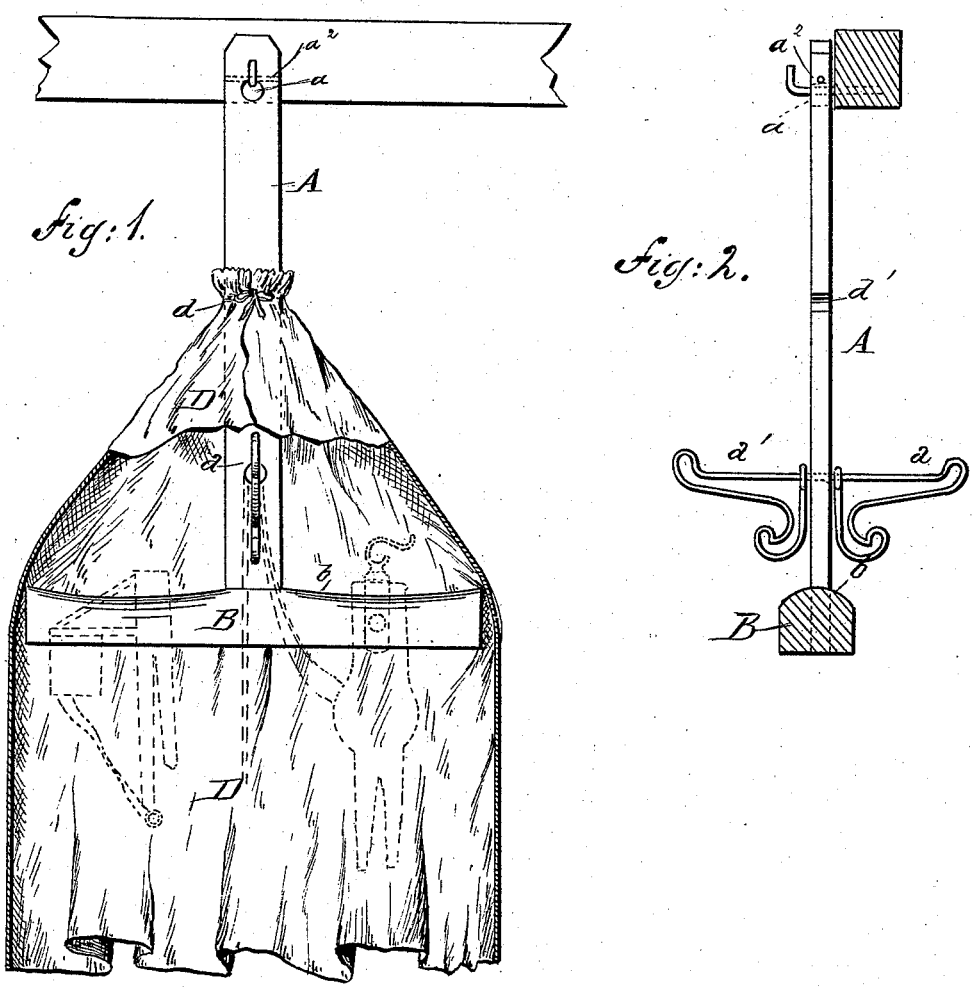
WITNESSES:
INVENTOR:
W. H. Robinson
BY Munn & Co
ATTORNEYS.

UNITED STATES PATENT OFFICE.

WALTER HEWITT ROBINSON, OF FARGO, DAKOTA TERRITORY.

SUSPENSION HARNESS-RACK.

SPECIFICATION forming part of Letters Patent No. 366,030, dated July 5, 1887.

Application filed November 26, 1886. Serial No. 219,950. (No model.)

*To all whom it may concern:*

Be it known that I, WALTER HEWITT ROBINSON, of Fargo, in the county of Cass and Territory of Dakota, have invented a new and Improved Suspension Harness-Rack, of which the following is a full, clear, and exact description.

My invention relates to a harness-rack adapted particularly for suspension from the ceiling of a carriage-house, barn, or any apartment wherein the harness is usually kept, and has for its object to provide a rack upon which all parts of a harness may be conveniently hung, readily manipulated, and cleaned; and also to provide a covering, in connection with said rack, to protect the said harness from exposure.

The invention consists in the construction and combination of the several parts, as will be hereinafter fully set forth, and pointed out in the claims.

Reference is to be had to the accompanying drawings, forming a part of this specification, in which similar letters of reference indicate corresponding parts in both the figures.

Figure 1 is a front elevation of my rack suspended for use, and Fig. 2 is a longitudinal vertical section of the same.

In the construction of my harness rack I employ a standard, A, having an aperture, $a$, at one end, and ordinary double hooks, $a'$, screwed centrally thereon near the other, upon each side, preferably in the same horizontal plane. By means of a mortise-joint, or otherwise, I secure the end of the said standard A, below the double hooks $a'$, centrally within a horizontal bar, B, thereby giving the rack the appearance of an inverted T. Upon each side of the vertical standard A the horizontal bar B is provided, upon its upper edge, with a concaved rounded surface, $b$, which concavity is made to extend from the intersecting edges of said standard to the extreme edges of the said horizontal bar. To strengthen the aperture $a$ in the standard, a pin, $a^2$, is entered transversely the same, above said aperture. A curtain, D, of any suitable fabric, is now provided, which is usually secured to the standard A by a draw-string, $d$, in the top thereof, engaging notches $d'$, cut in the edges of said standard, about centrally the same, the curtain D being adapted to hang down and around that portion of the rack purposed to carry the harness.

The entire rack may be made of metal; but I prefer to use a hard wood for the purpose, excepting the hooks $a'$, which should be metal.

In operation the rack may be suspended by means of the aperture $a$ engaging a hook or pin overhead, or the said rack may be screwed or otherwise securely attached to the beams or any convenient elevated support. I prefer, however, to have the rack readily detachable.

In distributing the harness, as shown in dotted lines in Fig. 1, the traces and lines may be hung from the hooks $a'$, while the martingales, saddle, hames, and other portions thereof may be distributed over the rounded and concaved upper surface of the horizontal carrying-bar B.

Through the use of my rack the harness is readily manipulated upon the horizontal bar, and therefore easily and handily cleaned, while the various pieces may be kept protected from dust and handling by means of the incasing-curtain D, and in case of emergency—such as fire—the rack and harness may be taken down intact and carried out.

The rack readily accommodates two sets of harness.

Having thus fully described my invention, I claim as new and desire to secure by Letters Patent—

1. In a suspension harness-rack, the combination, with the vertical standard A, provided with hooks $a'$, of the horizontal bar B, having its upper edges provided with a concaved and rounded surface, $b$, substantially as shown and described, and for the purpose herein set forth.

2. In a suspension harness-rack, the combination, with the vertical standard A, provided with an aperture, $a$, notches $d'$, and hooks $a'$, of the horizontal bar B, having its upper edges provided with a concaved and rounded surface, $b$, and the curtain D, fastened to said standard, substantially as herein shown and described, whereby the carrying portions of the rack are inclosed, as set forth.

WALTER HEWITT ROBINSON.

Witnesses:
W. A. YERXA,
GEO. W. RIDDELL.